United States Patent
Metteer

(10) Patent No.: US 7,740,686 B2
(45) Date of Patent: Jun. 22, 2010

(54) MODULAR DUCTWORK DECONTAMINATION ASSEMBLY

(76) Inventor: Karen Metteer, 2579 E. Fremont Ave., Fresno, CA (US) 93710

( * ) Notice: Subject to any disclaimer, the term of this patent is extended or adjusted under 35 U.S.C. 154(b) by 332 days.

(21) Appl. No.: 12/017,671

(22) Filed: Jan. 22, 2008

(65) Prior Publication Data
US 2008/0173178 A1    Jul. 24, 2008

Related U.S. Application Data

(60) Provisional application No. 60/885,980, filed on Jan. 22, 2007.

(51) Int. Cl.
*B03C 3/016* (2006.01)
(52) U.S. Cl. .................. 95/58; 95/78; 96/16; 96/52; 96/63; 96/64; 96/94; 96/224; 422/24; 422/186.07; 422/186.13
(58) Field of Classification Search .......... 95/2, 95/58, 63, 69, 70, 78; 96/16, 18, 52, 55, 96/57, 63, 64, 74, 94, 224; 422/24, 28, 123, 422/124, 186.07, 186.13
See application file for complete search history.

(56) References Cited
U.S. PATENT DOCUMENTS 3,804,942 A * 4/1974 Kato et al. ............... 423/239.1
3,844,741 A * 10/1974 Dimitrik ...................... 96/16
5,656,063 A * 8/1997 Hsu ............................. 95/58
5,667,563 A * 9/1997 Silva, Jr. ..................... 96/50
5,993,738 A * 11/1999 Goswani .................... 422/22
6,063,170 A * 5/2000 Deibert ...................... 96/224
6,623,544 B1* 9/2003 Kaura ........................ 95/3
2002/0144601 A1* 10/2002 Palestro et al. ............ 95/273
2003/0217641 A1* 11/2003 Palestro et al. ............ 95/273
2005/0150386 A1* 7/2005 Cheng ....................... 96/223
2006/0201328 A1* 9/2006 Chiang ....................... 96/50
2007/0022879 A1* 2/2007 Aiba .......................... 95/58
2007/0227362 A1* 10/2007 Parker ...................... 96/224

FOREIGN PATENT DOCUMENTS

GB        2036951 A  * 7/1980 ................ 96/16

* cited by examiner

*Primary Examiner*—Richard L Chiesa
(74) *Attorney, Agent, or Firm*—McAndrews, Held & Malloy, Ltd.

(57) ABSTRACT

A modular ductwork assembly decontaminates an air stream circulating within an heating, ventilation and air conditioning (HVAC) system. The assembly includes (a) an ionizing module for removing particulates from the air stream, (b) a sterilization module for neutralizing airborne pathogens present in the air stream, (c) an ozone treatment module for neutralizing odoriferous constituents or volatile organic compounds (VOCs) present in the air stream, optionally (d) baffles for slowing and disrupting the flow rate and promoting turbulence in the air stream traveling through the modules and optionally (e) a fan module for directing a treated air stream. Each of the modules is arranged substantially adjacent to at least one of the other modules.

20 Claims, 4 Drawing Sheets

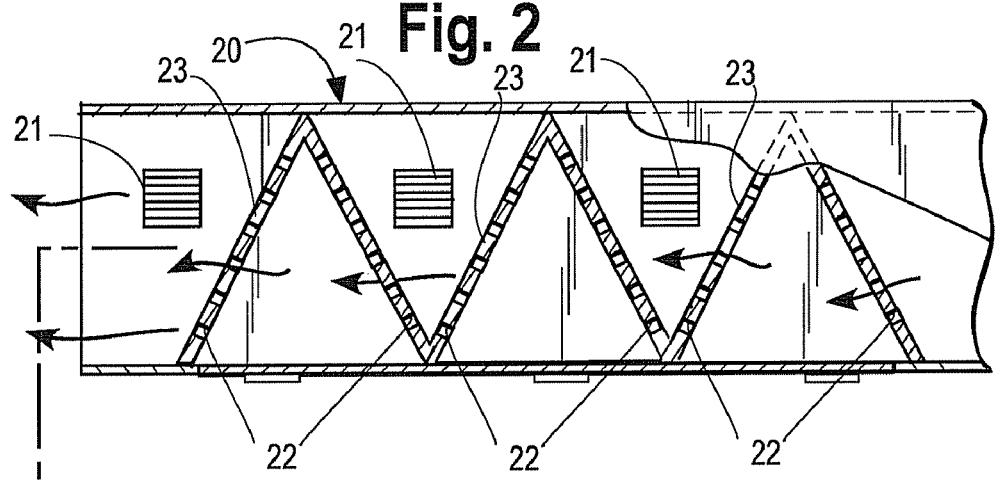
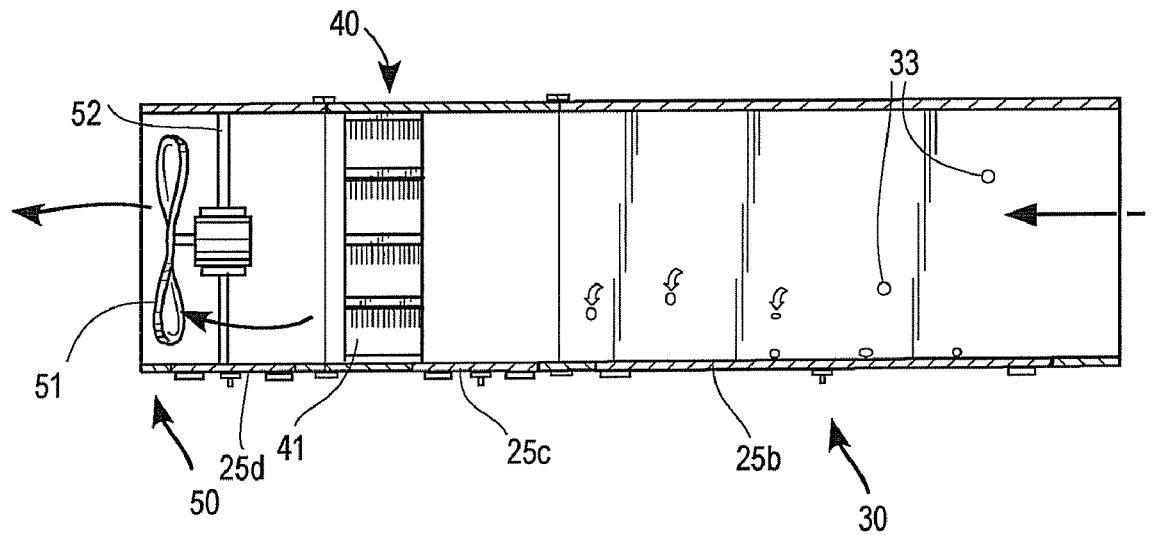
Fig. 2

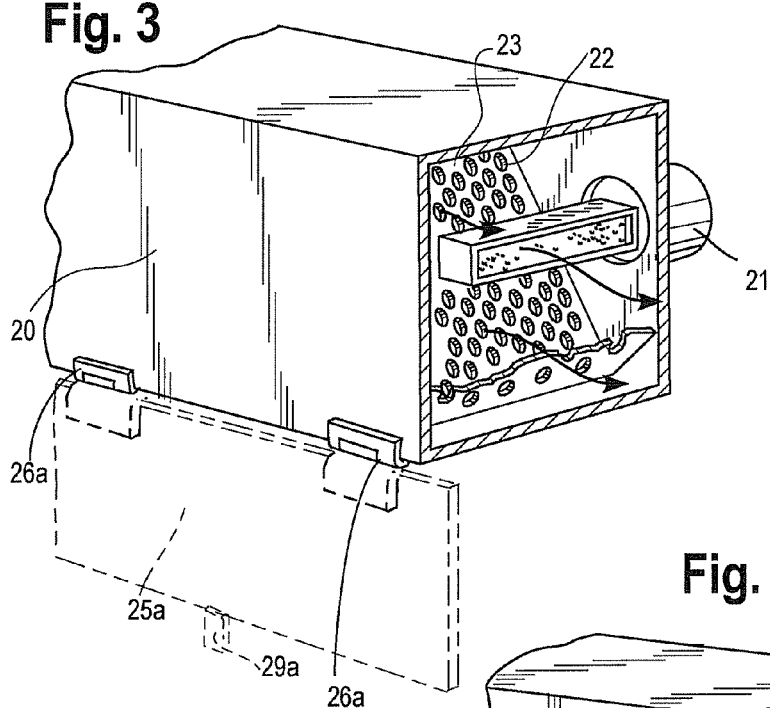
Fig. 3
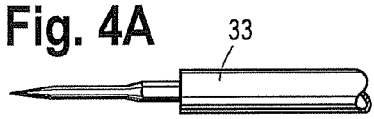
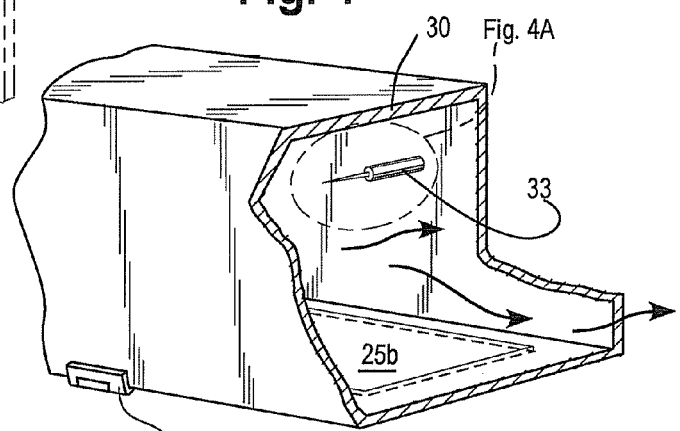
Fig. 4
Fig. 4A
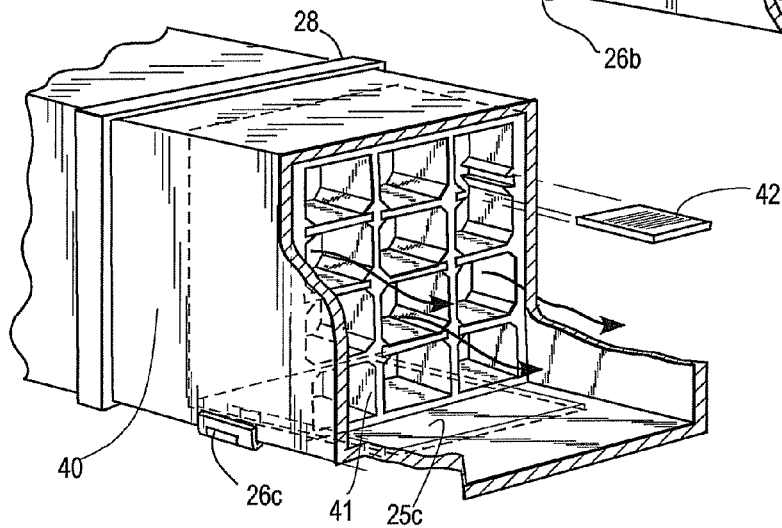
Fig. 5

MODULAR DUCTWORK DECONTAMINATION ASSEMBLY

CROSS REFERENCE TO RELATED APPLICATION(S)

This application is related to and claims priority benefits from U.S. Provisional Patent Application Ser. No. 60/885,980 filed Jan. 22, 2007, entitled "Modular Ductwork Decontamination Assembly". The '980 provisional application is hereby incorporated by reference herein in its entirety.

FIELD OF THE INVENTION

The present technology relates to heating, ventilation and air conditioning (HVAC) systems. In particular, the present technology relates to a modular ductwork assembly for decontaminating an air stream circulating within an HVAC system.

BACKGROUND OF THE INVENTION

The present technique addresses the problem of reducing or eliminating contaminants, including particulate, dust, mold, mildew, odors, bacteria, viruses and volatile organic compounds (VOCs), within the air stream of HVAC systems.

Several companies presently offer commercial ultraviolet (UV) probe lights that are configured to extend from the interior walls of HVAC ductwork to remediate indoor air contamination problems at discrete locations.

Configuring individual probes, ionizers and ozonators in HVAC ductwork on an as-needed basis is time-consuming and expensive. An electrician is hired to crawl alongside ductwork to install such ductwork components at recommended intervals (for example, every 15 feet (4.57 meters)), and then to install wiring to electrically connect each component to the building's main electrical system. UV probes are only capable of treating bacteria, ionizers only treat particulates and ozonators only treat odors. These components, by themselves, do not solve all of the air quality problems listed above, namely: mold, mildew, bacteria, viruses, VOCs, odors and particulates at one location with one installation.

SUMMARY OF THE INVENTION

The present technique is unique in that it provides modular ductwork units containing an array of air treatment technologies. The present modular ductwork decontaminating technique achieves this in a single location in a single installation with comparatively little effort, expense and maintenance.

One or more of the shortcomings of prior, conventional air stream decontamination systems within HVAC ductwork is overcome by a modular ductwork assembly for decontaminating an air stream circulating within an HVAC system. The assembly comprises:

(a) a sterilization module for neutralizing airborne pathogens present in the air stream;

(b) an ionizing module for removing particulates from the air stream; and (c) an ozone treatment module for neutralizing odoriferous constituents present in the air stream, Each of the modules is arranged substantially adjacent to at least one of the other modules.

In a preferred embodiment, the present ductwork decontamination assembly further comprises a plurality of baffles for slowing and/or disrupting the flow rate and promoting turbulence in the air stream traveling through the modules.

In another preferred embodiment, the present ductwork decontamination assembly optionally includes a fan module for directing the air stream through the modules. At least one of the modules comprises a latchable door for accessing the module interior.

In another preferred embodiment, the ionizing module comprises at least one ionizer, more preferably a plurality of ionizers. The at least one ionizer is capable of electrically charging particulates which causes them to aggregate and fall on the module floor.

The sterilization module preferably comprises at least one lamp capable of directing ultraviolet radiation toward the air stream. The at least one lamp is capable of directing at least one of ultraviolet (UV) radiation, ultraviolet-C (UVC) and ultraviolet-X (UVX) radiation toward the air stream, thereby sterilizing microbes and halting reproduction.

The ozone treatment module preferably comprises at least one ozone generator, more preferably a plurality of ozone generators, capable of converting gaseous molecules into elements of carbon, hydrogen and oxygen.

A method for decontaminating an air stream circulating within an HVAC system comprises:

(a) interposing an ionizing module in the air stream for removing particulates therefrom;

(b) interposing a sterilization module in the air stream for neutralizing airborne pathogens present therein; and (c) interposing an ozone treatment module in the air stream for neutralizing odoriferous constituents present therein.

Each of the modules is arranged substantially adjacent to at least one of the other modules.

This present modular assembly is capable of remediating contaminated indoor air streams in a single installation and with a single 110 VAC (60 Hz) electrical outlet.

BRIEF DESCRIPTION OF THE DRAWINGS

FIG. 2 is a side sectional view of portions of the extendable modular ductwork decontamination assembly illustrated in FIG. 1.

FIG. 3 is a perspective view, partially in section, of a portion of the modular ductwork decontamination assembly illustrated in FIG. 1, which incorporates baffles for disrupting an air stream traveling through the modules and an ultraviolet/ultraviolet-C/ultraviolet-X (UV/UVC/UVX) sterilizing probe. A corresponding access door is shown in open position.

FIG. 4 is a perspective view, partially in section, of a portion of the present modular ductwork decontamination assembly, showing the mounting of an ionizer, with the corresponding access door in the closed position.

FIG. 4a is an enlarged side view of an ionizer employed in the present modular decontamination assembly.

FIG. 5 is a perspective view, partially in section, of a portion of the present modular ductwork decontamination assembly, showing the componentry of the ozone treatment module. A corresponding access door is shown in closed position.

DETAILED DESCRIPTION OF THE PREFERRED EMBODIMENTS

Figure 1:
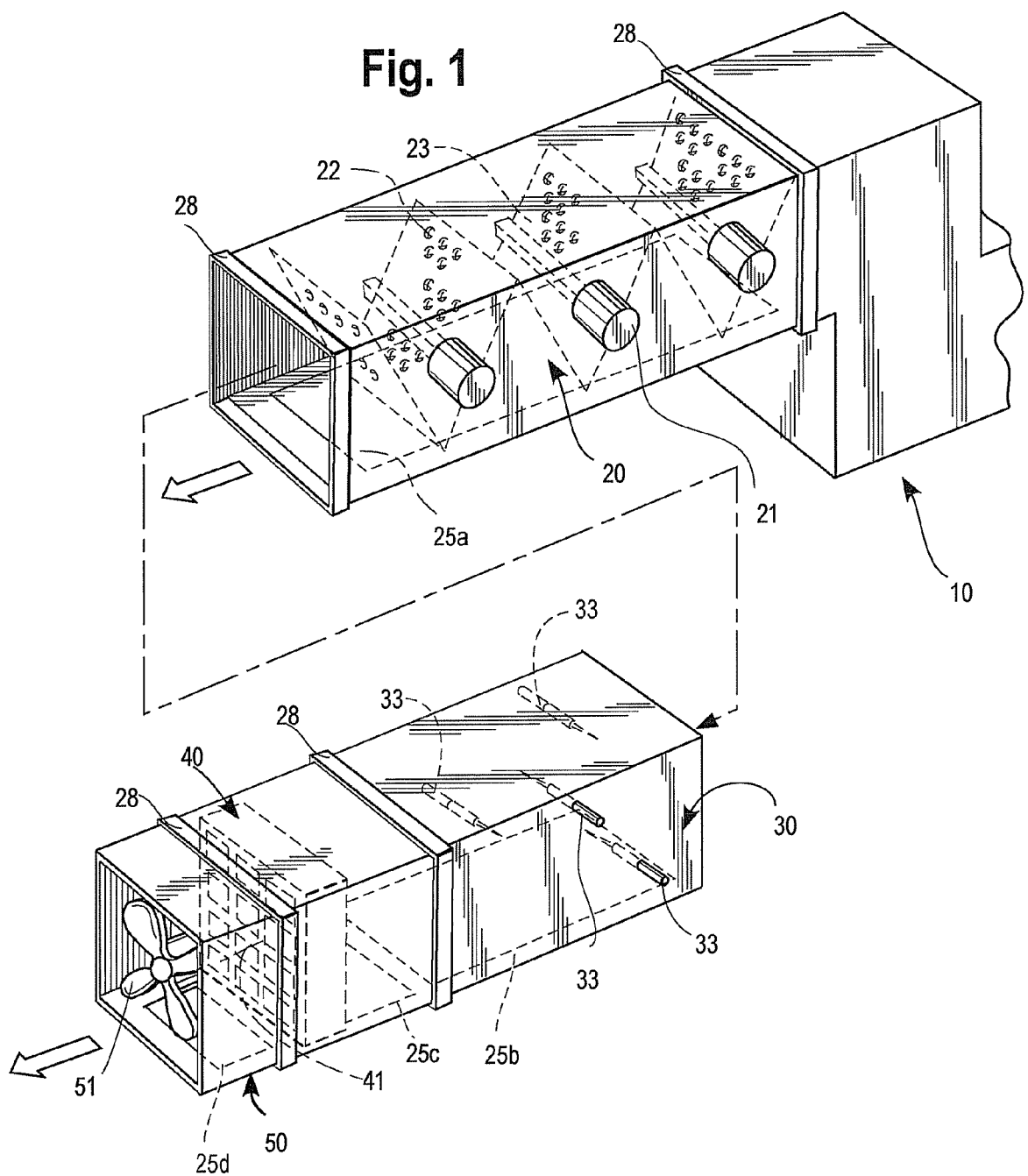
FIG. 1 is perspective view of the present modular ductwork decontamination assembly, showing the interior components in hidden lines.

Turning first to FIG. 1, HVAC system 10 directs an air stream (depicted by a hollow, exiting arrow) through a ductwork system. Ductwork decontamination assembly 20, in regular 4 foot (1.22 m), 5 foot (1.52 m), 10 foot (3.04 m) or other customized lengths, can be variously shaped to satisfy treatment and design needs. Barriers/baffles 23, arranged according to size and shape of the ductwork housing, are intended to slow the incoming air stream flow from the upstream HVAC system. Perforations 22, arranged in various patterns and sizes, are intended to impart turbulence and thereby effectively mix the air stream flowing through the interior passageway of ductwork 20.

Optional modules are included in the ductwork. These optional modules can include a sterilization module, an ionizing module an ozone treatment module and fan modules. The sterilization module neutralizes airborne pathogens present in the air stream using an ultraviolet/ultraviolet-C/ultraviolet-X (UV/UVC/UVX) sterilizing probe. The ionizing module removes particulates from the air stream by charging the particulates which causes them to aggregate and fall out of the air stream. The ozone treatment module neutralizes odoriferous constituents present in the air stream by converting gaseous molecules into elements of carbon, hydrogen and oxygen. The modules can be ordered in various arrangements depending on the space available and the user's needs.

HVAC fittings 28 provide connection(s) between the upstream HVAC system and module fittings (and optionally other fittings), for the optional sterilization module(s), optional ionizing module(s), optional ozone treatment module(s), the remaining optional fan modules, and between other optional ductwork before, between or after the module (s).

One of the benefits of the current modular ductwork contamination system is that it is extendable and repeatable. This allows the user to customize a ductwork system to his or her particular needs. For example, in an environment where pathogens are a concern, such as a hospital, multiple sterilization modules could be used in order to further sterilize the air stream. In another example, multiple ozone treatment modules could be used for particularly odiferous areas.

In one embodiment, the optional modules can be located close to the HVAC center. The air can then be treated at its source before going off to the other areas of the building. In some situations it will be desirable to put modules on each floor, so that the air is consistent throughout the building. As discussed above, certain modules could also be congregated where certain concerns exist, such as odor problems, particulate problems and pathogen problems. The modules could also be located in different areas due to space constraints of the HVAC ductwork.

As shown in FIG. 1 the ionizing modules are isolated from the sterilization modules and ozone treatment modules. This is because of particulate accumulation. When the particulate matter is charged by the ionizer it aggregates and falls to the ground or walls of the module. This could become problematic if the sterilization probes or ozone generators were located in the same module because they would become covered in particulate matter. The probes or ozone generators would not function as efficiently unless cleaned often. Separating the ionizing modules from the other modules avoids this complication.

FIG. 2 shows extendable modular ductwork decontamination assembly with optional arrangements of UV sterilization 20 and ionizer components 30 alternating from front to back and from back to front, with optional ozone generator module 40 and optional fan module 50. Ionizers 33 in ionization module 30 affect particulate, causing aggregation and fallout on module floor as demonstrated by hollow arrows.

FIG. 3 shows the mounting of an ultraviolet lamp 21, as well as the location of hinge 26a of access door 25a. Ultraviolet (UV) and/or ultraviolet-C (UVC) and/or ultraviolet-X (UVX) and/or other type of ultraviolet lamp(s) 21, are arranged in various patterns, directions and/or positions between barriers/baffles 23 to sterilize the genetic material of airborne microorganisms and/or pathogens.

FIG. 4 ionizing module 30, contains mounted ionizer(s) 33, of potentially various types and/or sizes, arranged in various locations to electrostatically aggregate various forms of particulate matter, which falls by static charge and gravity to the bottom of the ductwork housing. Access door 25b provides access to the interior of the ductwork module housing for cleaning and maintenance.

FIG. 5 shows componentry of ozone treatment module 40, and includes a representative type of ozone generator 42. Module 40 is capable of housing various sizes and types of ozone generators. In this regard, ozone treatment module support frame 41 provides structural and attachment support for various sizes and types of ozone generators. Ozone generator(s) 42 generate sufficient ozone, preferably as regulated by remote control electrical switching or equivalent software, to remediate various odors and/or VOCs. Also shown is hinge 26c for access door 25c in closed position.

Figure 6:
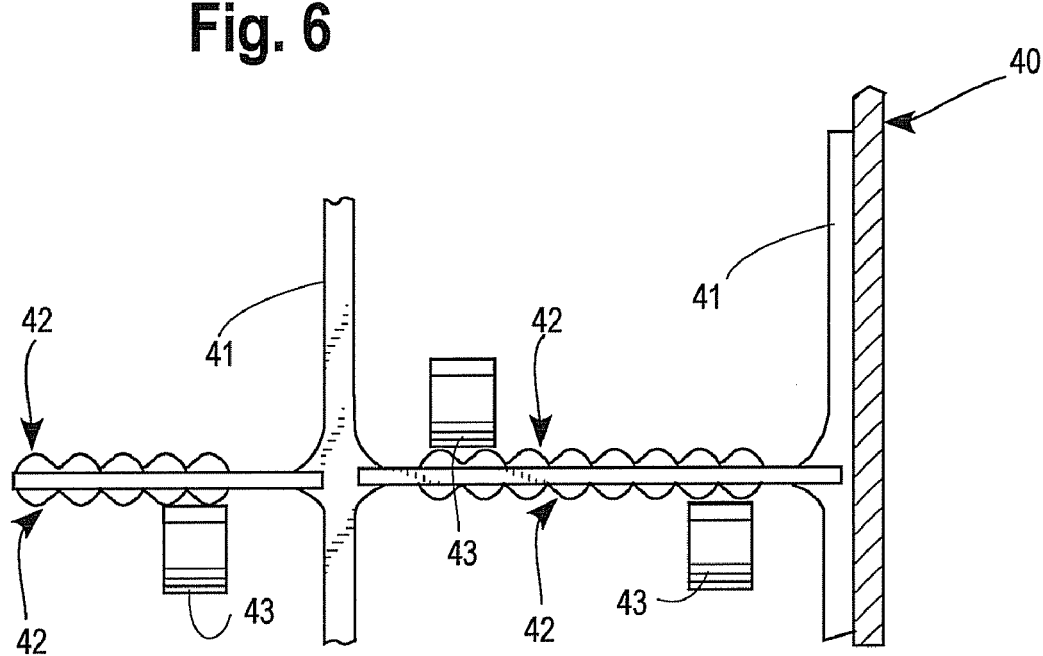
FIG. 6 is a front sectional view of the ozone treatment module of the modular ductwork decontamination assembly illustrated in FIG. 5.

FIG. 6 illustrates a side view embodiment of cathode/anode contacts 43 to provide electrical supply to ozone treatment generators 42 in ozonating module 40. Support structure 41 for ozonators 42 and electrical components 43 is fitted to module housing 40.

Figure 7:
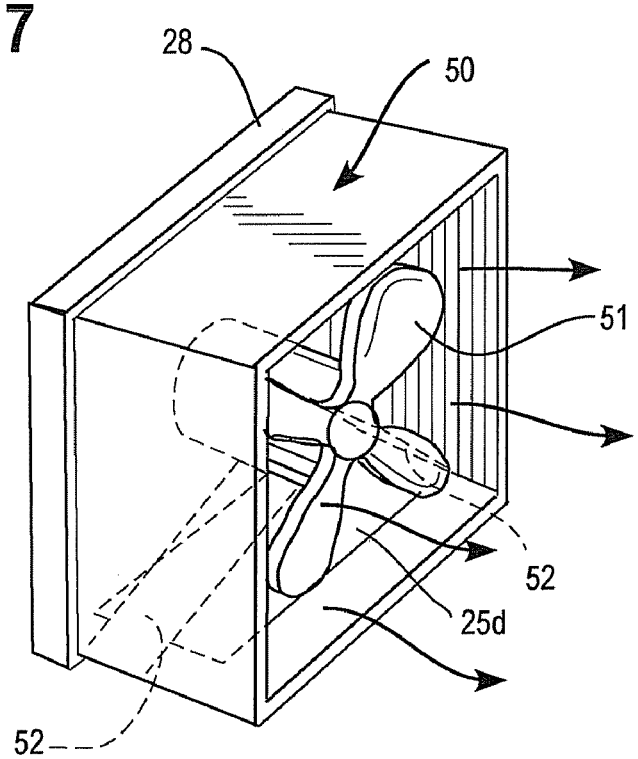
FIG. 7 is a perspective view of a portion of the present modular ductwork decontamination assembly, showing the fan module for directing the air stream through the HVAC ductwork.

FIG. 7 shows fan module 50, which includes attachment support(s) 52 and a fan 51 (could also be referred to optionally as a blower, vane or turbine). Fan module 50 is capable of housing various types and sizes of fans, blowers, vanes and/or turbines, which induce the treated air stream to flow at a rate (in cubic feet per minute (CFM) in English units or cubic meters per minute (CMM), 1.0 CFM being equal to 0.028 CMM) as required or desirable for the volume of recirculated air to be treated. Additionally shown is access door 25d in closed position.

FIG. 4a shows one type of ionizer 33 that is suitable for use in the present modular ductwork decontamination assembly. FIG. 5 shows the mounting of ozonator 42, with the corresponding access door 25c in the closed position. FIGS. 3, 4, 5 illustrate the location of access door hinges 26a, 26b and 26c, respectively. FIG. 3 demonstrates one module's access door latch 29a which secures access doors to the bottom of each module, thereby safely and securely shielding the exterior to ductwork assembly 20 from UV rays generated within the UV sterilization module. Door latch 29a also inhibits outside objects from entering the interior of ductwork assembly 20. Such secure latching can be applied to at least some modules.

As shown in FIGS. 1 & 2 (25a, 25b, 25c, 25d), FIG. 3 (25a), FIG. 4 (25b), FIG. 5 (25c), and FIG. 7 (25d), hinged, latchable doors provide access for cleaning and maintenance of the ductwork modules' interior surfaces as well as protection.

Note that the modules of the present extendable ductwork decontamination assembly can be arranged in various sequences to customize air treatment in multiple areas with unique, individual treatment concerns. In this regard, the assembly could be optionally configured as follows:

(1) additional ozone generators can be included for high odor and VOC spaces;
(2) additional ionizers could be included for heavy particulate spaces;
(3) additional UV/UVC/UVX or optional UV lamps could be included in bacteria-, virus- and mold-infested spaces;
(4) additional fans could be included for more expansive spaces requiring higher air stream flow rates to reach at least a portion of the space to be treated;
(5) additional baffles with various types and sizes of perforations could be incorporated to slow and disrupt the flow rate and promote turbulence in heavily contaminated air streams.

The present modular ductwork decontamination assembly can be installed in various configurations within an HVAC system outlet or as needed within the extended ductwork system to treat individual interior spaces. Maintenance, cleaning and parts replacement occurs at the modular component site only, and not along ductwork routes. Individual, sequential installations of various types of treatment units by an electrician are not necessary. Probes, ionizers and ozonators can be routinely checked, cleaned or replaced at one time and at one location. This makes the present modular ductwork decontamination assembly efficient, timesaving and economical by comparison with current ductwork cleaning and maintenance methods. A single, modular assembly can be designed to treat an entire home or an entire floor of a building. This is a vast improvement over placing air cleaning units within individual interior spaces to be treated and hiring electricians to wire probes at regular intervals in an HVAC ductwork system.

One or more of the following results is achievable using the present modular ductwork decontamination assembly:

(1) particulate is removed from the air without the use of expensive, high-maintenance filters. Particles are electronically charged to clump and fall by gravity onto the ductwork access door.
(2) harmful microorganisms are rendered reproductively sterile through DNA alteration provided by UV light.
(3) VOCs and odors are reduced by altering the molecular structure of the gaseous elements and converting these compounds into non-volatile elements of carbon, hydrogen and oxygen via the free electrons supplied by ozone.

The present modular ductwork decontamination assembly has at least one or more of the following advantages over prior, conventional systems:

(a) all treatment activity occurs in one modular portion of the HVAC ductwork system rather than at variously scattered and individually located application modes.
(b) all cleaning and maintenance takes place in one location via the easy-access door(s) at the bottom of each ductwork module.
(c) probes are self-cleaning; ozonator plates and ionizers are readily cleaned and/or replaced via easy-access doors; parts are replaceable components.
(d) installation, cleaning and maintenance of the present modular ductwork decontamination assembly is more economical than for scattered and individually located filter units, probes, ionizers and ozonators. Additionally, the present assembly does not employ expensive, high-efficiency particulate air (HEPA) type filters that must be cleaned and/or replaced.
(e) modular air-purifying ductwork can be designed by the building architect into the HVAC system as an integral part of the construction. Airflow treatment and delivery can be predetermined for each ductwork module. Thus the time expenditure and difficulty of collecting and calibrating various types of flow rate (CFM/CMM) information for various kinds of air treatment systems is unnecessary. Each ductwork module's CFM/CMM treatment effectiveness is predetermined and controlled remotely according to the owner's preference.
(f) internal arrangement and numbers of the sterilizing ductwork module's various sizes, baffles, UV probes, ionizers, and ozonators as well as types and sizes of perforations and fans can be designed to suit the treated area's specific size, air quality issues, and temperature range.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A modular ductwork assembly for decontaminating an air stream circulating within an HVAC system, the assembly comprising:
   (a) at least one ionizing module for removing particulates from said air stream;
   (b) at least one sterilization module for neutralizing airborne pathogens present in said air stream; and
   (c) at least one ozone treatment module for neutralizing odoriferous constituents present in said air stream,
   wherein each of said modules is arranged substantially adjacent to at least one of the other modules.

2. The ductwork decontamination assembly of claim 1, further comprising:
   (d) a plurality of baffles for disrupting the air stream traveling through the modules.

3. The ductwork decontamination assembly of claim 1, further comprising a fan module for directing said air stream through said modules.

4. The ductwork decontamination assembly of claim 1, wherein at least one of said modules comprises a latchable door for accessing said module interior.

5. The ductwork decontamination assembly of claim 1, wherein said ionizing module comprises at least one ionizer.

6. The ductwork decontamination assembly of claim 1, wherein said sterilization module comprises at least one lamp capable of directing ultraviolet radiation toward said air stream.

7. The ductwork decontamination assembly of claim 5, wherein said at least one lamp is capable of directing at least one of ultraviolet radiation, ultraviolet-C, ultraviolet-X, or other safe form of sterilizing light toward said air stream.

8. The ductwork decontamination assembly of claim 1, wherein said ozone treatment module comprises at least one ozone generator.

9. The ductwork decontamination assembly of claim 8, wherein said at least one ozone generator comprises a plurality of ozone generators.

10. The ductwork decontamination assembly of claim 1, wherein the ionizing module is separated from the sterilization module and the ozone treatment module.

11. A method for decontaminating an air stream circulating within an HVAC system, the method comprising:
(a) interposing at least one ionizing module in said air stream for removing particulates therefrom;
(b) interposing at least one sterilization module in said air stream for neutralizing airborne pathogens present therein; and
(c) interposing at least one ozone treatment module in said air stream for neutralizing odoriferous constituents or volatile organic compounds present therein,
wherein each of said modules is arranged substantially adjacent to at least one of the other modules.

12. The method for decontaminating an air stream circulating within an HVAC system of claim 11, further comprising:
(d) disrupting the air stream through the modules using a plurality of baffles.

13. The method for decontaminating an air stream circulating within an HVAC system of claim 11, further comprising directing said air stream through said modules using a fan module.

14. The method for decontaminating an air stream circulating within an HVAC system of claim 11, wherein said ionizing module comprises at least one ionizer.

15. The method for decontaminating an air stream circulating within an HVAC system of claim 11, wherein said sterilization module comprises at least one lamp capable of directing ultraviolet radiation toward said air stream.

16. The method for decontaminating an air stream circulating within an HVAC system of claim 15, wherein said at least one lamp is capable of directing at least one of ultraviolet radiation, ultraviolet-C, ultraviolet-X, or other safe form of sterilizing light toward said air stream.

17. The method for decontaminating an air stream circulating within an HVAC system of claim 11, wherein said ozone treatment module comprises at least one ozone generator.

18. The method for decontaminating an air stream circulating within an HVAC system of claim 17, wherein said at least one ozone generator comprises a plurality of ozone generators.

19. The method for decontaminating an air stream circulating within an HVAC system of claim 11, wherein the ionizing module is separated from the sterilization module and the ozone treatment module.

20. A method of customizing a ductwork assembly for decontaminating an air stream circulating within an HVAC system, the method comprising:
(a) assessing a problem from the group comprising pathogen problems, odor problems, and particulate problems;
(b) interposing at least one ionizing module in said air stream where a particulate problem is assessed;
(c) interposing at least one sterilization module in said air stream where a pathogen problem is assessed; and
(d) interposing at least one ozone treatment module in said air stream where an odor problem is assessed,
wherein each of said modules is arranged substantially adjacent to at least one of the other modules.

* * * * *